US012187900B2

(12) United States Patent
Seydel et al.

(10) Patent No.: US 12,187,900 B2
(45) Date of Patent: Jan. 7, 2025

(54) HIGH CHROMATICITY PIGMENT FLAKES AND FOILS

(71) Applicant: VIAVI SOLUTIONS INC., Milpitas, CA (US)

(72) Inventors: Johannes Seydel, Petaluma, CA (US); Paul Thomas Kohlmann, Windsor, CA (US); Mark Tevis, Novato, CA (US); Jeffrey James Kuna, San Francisco, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 61 days.

(21) Appl. No.: 15/194,298

(22) Filed: Jun. 27, 2016

(65) Prior Publication Data

US 2017/0368866 A1  Dec. 28, 2017

(51) Int. Cl.
| | |
|---|---|
| C09C 1/00 | (2006.01) |
| B42D 25/29 | (2014.01) |
| B42D 25/328 | (2014.01) |
| B42D 25/369 | (2014.01) |
| B42D 25/373 | (2014.01) |
| B42D 25/445 | (2014.01) |
| C23C 4/06 | (2016.01) |

(52) U.S. Cl.
CPC ............ *C09C 1/0015* (2013.01); *B42D 25/29* (2014.10); *B42D 25/328* (2014.10); *B42D 25/369* (2014.10); *B42D 25/373* (2014.10); *B42D 25/445* (2014.10); *C09C 1/0033* (2013.01); *C09C 1/006* (2013.01); *C23C 4/06* (2013.01); *C01P 2006/42* (2013.01); *C09C 2200/1008* (2013.01); *C09C 2200/24* (2013.01); *C09C 2200/305* (2013.01); *C09C 2200/306* (2013.01); *C09C 2200/505* (2013.01); *C09C 2220/10* (2013.01)

(58) Field of Classification Search
CPC ................ C08K 3/36; C08K 2201/003; C08K 2201/005; B32B 7/12; C01P 2006/42
See application file for complete search history.

(56) References Cited

U.S. PATENT DOCUMENTS

| | | | |
|---|---|---|---|
| 2,688,007 | A | 8/1954 | Steinman |
| 3,425,975 | A | 2/1969 | Barrett |

(Continued)

FOREIGN PATENT DOCUMENTS

| | | |
|---|---|---|
| CN | 1286761 A | 3/2001 |
| CN | 1423212 A | 6/2003 |

(Continued)

OTHER PUBLICATIONS

Swiler, Pigments, Inorganic, 2005, Kirk-Othmer Encyclopedia of Chemical Technology, pp. 1-37. (Year: 2005).*

(Continued)

*Primary Examiner* — Monique R Jackson
(74) *Attorney, Agent, or Firm* — Mannava & Kang, P.C.

(57) ABSTRACT

An article including at least one first metallic layer, at least one dielectric layer, and at least one second metallic layer is disclosed. The at least one dielectric layer can include at least one of (i) a photo-initiator, (ii) an oxygen inhibition mitigation composition, (iii) a leveling agent, and (iv) a defoamer. The article can be in the form of a foil or pigment flake, and can also include a magnet containing layer.

11 Claims, 2 Drawing Sheets

(56) References Cited

U.S. PATENT DOCUMENTS

| | | | |
|---|---|---|---|
| 3,997,485 A | 12/1976 | Dowbenko et al. | |
| 4,017,326 A | 4/1977 | Davis | |
| 4,071,489 A | 1/1978 | Emmons et al. | |
| 4,100,133 A | 7/1978 | Emmons et al. | |
| 4,129,537 A | 12/1978 | Dhein et al. | |
| 4,216,252 A | 8/1980 | Moeller | |
| 4,332,861 A | 6/1982 | Franz et al. | |
| 4,639,069 A | 1/1987 | Yatabe et al. | |
| 5,055,345 A | 10/1991 | Wank et al. | |
| 5,102,925 A | 4/1992 | Suzuki et al. | |
| 5,135,812 A * | 8/1992 | Phillips | C03C 17/00 428/404 |
| 5,136,404 A | 8/1992 | Nobile et al. | |
| 5,219,900 A | 6/1993 | Davies et al. | |
| 5,346,569 A | 9/1994 | Simon | |
| 5,471,331 A | 11/1995 | Takizawa et al. | |
| 5,569,535 A | 10/1996 | Phillips et al. | |
| 5,582,645 A | 12/1996 | Trest et al. | |
| 5,641,544 A | 6/1997 | Melancon et al. | |
| 5,700,607 A * | 12/1997 | Rath | G03F 7/027 430/14 |
| 5,743,981 A | 4/1998 | Lu | |
| 5,877,895 A * | 3/1999 | Shaw | G02B 5/287 359/585 |
| 6,132,504 A | 10/2000 | Kuntz et al. | |
| 6,139,613 A | 10/2000 | Hendrickson et al. | |
| 6,150,022 A | 11/2000 | Coulter et al. | |
| 6,156,115 A | 12/2000 | Pfaff et al. | |
| 6,235,105 B1 | 5/2001 | Hubbard et al. | |
| 6,236,510 B1 | 5/2001 | Bradley, Jr. et al. | |
| 6,243,204 B1 | 6/2001 | Bradley, Jr. et al. | |
| 6,299,979 B1 | 10/2001 | Neubauer et al. | |
| 6,376,018 B1 | 4/2002 | Kittler, Jr. | |
| 6,383,638 B1 | 5/2002 | Coulter et al. | |
| 6,531,221 B1 * | 3/2003 | Schuhmacher | C09B 67/0098 428/1.2 |
| 6,572,784 B1 | 6/2003 | Coombs et al. | |
| 6,686,042 B1 | 2/2004 | LeGallee | |
| 6,749,936 B2 | 6/2004 | Argoitia et al. | |
| 6,783,349 B2 | 8/2004 | Neavin et al. | |
| 6,808,806 B2 | 10/2004 | Phillips et al. | |
| 6,818,299 B2 | 11/2004 | Phillips et al. | |
| 6,841,238 B2 | 1/2005 | Argoitia et al. | |
| 6,894,086 B2 | 5/2005 | Munro et al. | |
| 6,913,783 B2 | 7/2005 | Lazarev et al. | |
| 6,979,704 B1 | 12/2005 | Mayer et al. | |
| 6,997,981 B1 | 2/2006 | Coombs et al. | |
| 7,258,900 B2 | 8/2007 | Raksha et al. | |
| 7,261,950 B2 * | 8/2007 | Fleming | H05K 9/0094 174/350 |
| 7,390,715 B2 | 6/2008 | Ou et al. | |
| 7,455,904 B2 | 11/2008 | O'Keefe | |
| 7,518,284 B2 | 4/2009 | Benslimane et al. | |
| 7,625,596 B2 | 12/2009 | Lewis et al. | |
| 7,629,051 B2 | 12/2009 | Fukushige et al. | |
| 7,719,187 B2 * | 5/2010 | Ray | H05B 33/06 313/509 |
| 7,767,123 B2 | 8/2010 | Argoitia | |
| 7,850,359 B2 | 12/2010 | Jeng et al. | |
| 7,951,418 B2 | 5/2011 | O'Keefe | |
| 8,252,412 B2 | 8/2012 | Purdy et al. | |
| 8,372,685 B2 | 2/2013 | Robinson et al. | |
| 8,454,859 B2 * | 6/2013 | Lowenthal | C09D 11/52 252/514 |
| 8,557,332 B2 | 10/2013 | Watanabe et al. | |
| 8,586,457 B1 | 11/2013 | Liang et al. | |
| 8,591,775 B2 | 11/2013 | Fujdala et al. | |
| 8,641,933 B2 | 2/2014 | Purdy et al. | |
| 8,715,537 B2 | 5/2014 | Fujdala et al. | |
| 8,815,337 B2 | 8/2014 | Yializis et al. | |
| 8,852,476 B2 | 10/2014 | Decker | |
| 9,012,261 B2 | 4/2015 | Van Duren et al. | |
| 9,105,526 B2 | 8/2015 | Le et al. | |
| 9,105,527 B2 | 8/2015 | Van Duren et al. | |
| 9,212,089 B2 | 12/2015 | Arsten et al. | |
| 9,822,275 B2 * | 11/2017 | Hibben | C09D 5/16 |
| 10,048,415 B2 | 8/2018 | Banerjee et al. | |
| 10,928,579 B2 | 2/2021 | Seydel et al. | |
| 11,214,689 B2 | 1/2022 | Seydel et al. | |
| 2002/0015914 A1 | 2/2002 | Miyamoto et al. | |
| 2002/0137819 A1 | 9/2002 | Polonka | |
| 2002/0160194 A1 * | 10/2002 | Phillips | B42D 25/29 428/404 |
| 2002/0182383 A1 * | 12/2002 | Phillips | B05D 3/20 428/199 |
| 2003/0203222 A1 | 10/2003 | Phillips et al. | |
| 2003/0215641 A1 | 11/2003 | Phillips et al. | |
| 2004/0001973 A1 | 1/2004 | Gao et al. | |
| 2004/0012838 A1 | 1/2004 | Huibers et al. | |
| 2004/0160672 A1 | 8/2004 | Phillips et al. | |
| 2004/0166308 A1 * | 8/2004 | Raksha | C09D 7/62 428/329 |
| 2005/0150740 A1 | 7/2005 | Finkenzeller et al. | |
| 2005/0196584 A1 | 9/2005 | Halecki et al. | |
| 2005/0261389 A1 * | 11/2005 | Bratolavsky | C08G 18/2885 522/71 |
| 2005/0261406 A1 * | 11/2005 | Nakayama | C09D 4/00 524/284 |
| 2005/0267230 A1 * | 12/2005 | Esaki | C08F 290/06 522/172 |
| 2006/0023327 A1 | 2/2006 | Coombs et al. | |
| 2006/0068115 A1 | 3/2006 | Ogawa | |
| 2006/0094323 A1 | 5/2006 | Hong et al. | |
| 2006/0103781 A1 | 5/2006 | Jeng et al. | |
| 2006/0263539 A1 | 11/2006 | Argoitia | |
| 2006/0285184 A1 * | 12/2006 | Phillips | G02B 5/287 359/2 |
| 2007/0062445 A1 | 3/2007 | Kodou et al. | |
| 2007/0070494 A1 | 3/2007 | Brott et al. | |
| 2007/0230191 A1 | 10/2007 | Komuro et al. | |
| 2007/0231571 A1 | 10/2007 | Lane et al. | |
| 2008/0129928 A1 | 6/2008 | Jeng | |
| 2008/0170192 A1 | 7/2008 | Jeng | |
| 2009/0004478 A1 * | 1/2009 | Baetzold | C08G 18/672 428/412 |
| 2009/0081460 A1 | 3/2009 | Argoitia et al. | |
| 2009/0322993 A1 | 12/2009 | Saito et al. | |
| 2010/0055401 A1 | 3/2010 | Choi et al. | |
| 2010/0140916 A1 * | 6/2010 | Firth | C09D 5/36 283/82 |
| 2010/0261017 A1 | 10/2010 | Kikuchi | |
| 2011/0013260 A1 | 1/2011 | Ohno | |
| 2011/0042649 A1 | 2/2011 | Duvall et al. | |
| 2011/0299167 A1 | 12/2011 | Woolf | |
| 2012/0028009 A1 | 2/2012 | Gerardin et al. | |
| 2012/0108700 A1 | 5/2012 | Kanzaki et al. | |
| 2012/0177844 A1 | 7/2012 | Biver et al. | |
| 2013/0095333 A1 | 4/2013 | Pal et al. | |
| 2013/0164529 A1 | 6/2013 | Yu et al. | |
| 2013/0233719 A1 | 9/2013 | Zhao et al. | |
| 2013/0280854 A1 | 10/2013 | Jasieniak et al. | |
| 2014/0035995 A1 * | 2/2014 | Chou | B41J 2/01 347/20 |
| 2014/0037890 A1 * | 2/2014 | McJunkins | C09D 175/06 428/90 |
| 2014/0050768 A1 | 2/2014 | Struck et al. | |
| 2014/0110813 A1 | 4/2014 | Liang et al. | |
| 2014/0151607 A1 * | 6/2014 | Lowenthal | C09D 11/52 252/503 |
| 2014/0238833 A1 * | 8/2014 | Virkar | H03K 17/9622 200/600 |
| 2014/0322452 A1 | 10/2014 | Kasyanova et al. | |
| 2014/0322549 A1 | 10/2014 | Xu et al. | |
| 2015/0055033 A1 * | 2/2015 | Imamura | B32B 7/02 349/12 |
| 2015/0099119 A1 | 4/2015 | Farrand et al. | |
| 2015/0118408 A1 | 4/2015 | Hong et al. | |
| 2015/0123049 A1 | 5/2015 | Farrand et al. | |
| 2015/0126680 A1 | 5/2015 | Farrand et al. | |
| 2015/0129817 A1 | 5/2015 | Farrand et al. | |
| 2015/0129818 A1 | 5/2015 | Blackman et al. | |
| 2015/0129819 A1 | 5/2015 | Farrand et al. | |

(56) References Cited

U.S. PATENT DOCUMENTS

| | | | |
|---|---|---|---|
| 2015/0168746 A1 | 6/2015 | Blackman et al. | |
| 2015/0184031 A1 | 7/2015 | Yurt et al. | |
| 2015/0220057 A1 | 8/2015 | Tziovaras et al. | |
| 2015/0235745 A1* | 8/2015 | Choe | H01F 1/33 106/31.92 |
| 2015/0309353 A1 | 10/2015 | Stensvad et al. | |
| 2015/0316686 A1 | 11/2015 | Vanier et al. | |
| 2016/0076242 A1 | 3/2016 | Becker, IV et al. | |
| 2016/0085944 A1 | 3/2016 | Brophy et al. | |
| 2016/0088756 A1 | 3/2016 | Ramadas | |
| 2016/0168177 A1* | 6/2016 | Cunningham | G03F 7/029 522/11 |
| 2016/0264810 A1 | 9/2016 | Okamoto et al. | |
| 2016/0326374 A1 | 11/2016 | Kuna et al. | |
| 2016/0333526 A1 | 11/2016 | MacPherson et al. | |
| 2017/0291401 A1* | 10/2017 | Yamane | C09D 7/70 |
| 2017/0368798 A1 | 12/2017 | Seydel et al. | |
| 2017/0369709 A1 | 12/2017 | Seydel et al. | |
| 2017/0371091 A1 | 12/2017 | Seydel et al. | |
| 2020/0032111 A1* | 1/2020 | Ogawa | C09J 11/06 |
| 2021/0141144 A1 | 5/2021 | Seydel et al. | |

FOREIGN PATENT DOCUMENTS

| | | | |
|---|---|---|---|
| CN | 1485146 | | 3/2004 |
| CN | 1748874 | | 3/2006 |
| CN | 1825140 | A | 8/2006 |
| CN | 1946818 | | 4/2007 |
| CN | 101210975 | A | 7/2008 |
| CN | 101265681 | A | 9/2008 |
| CN | 100592980 | C | 3/2010 |
| CN | 101680975 | A | 3/2010 |
| CN | 101970587 | A | 2/2011 |
| CN | 102077060 | A | 5/2011 |
| CN | 102221722 | A | 10/2011 |
| CN | 102481723 | A | 5/2012 |
| CN | 102483567 | | 5/2012 |
| CN | 101897036 | B | 8/2012 |
| CN | 103415352 | | 11/2013 |
| CN | 103608183 | A | 2/2014 |
| CN | 103998955 | | 8/2014 |
| CN | 104884265 | A | 9/2015 |
| CN | 105283602 | | 1/2016 |
| CN | 106032407 | | 10/2016 |
| DE | 10349000 | | 5/2005 |
| DE | 102005017169 | | 10/2006 |
| DE | 102013021180 | | 6/2015 |
| DE | 102014001688 | | 8/2015 |
| EP | 0033896 | A1 * | 8/1981 ........... G03F 7/0388 |
| EP | 1239307 | | 9/2002 |
| EP | 1918334 | | 5/2008 |
| EP | 2538247 | | 12/2012 |
| JP | S5227892 | Y2 | 6/1977 |
| JP | S55160060 | | 12/1980 |
| JP | S5926251 | A | 2/1984 |
| JP | S60184001 | U | 12/1985 |
| JP | S6221041 | U | 2/1987 |
| JP | 1-36891 | Y2 | 11/1989 |
| JP | 02072700 | | 3/1990 |
| JP | H09113927 | A | 5/1997 |
| JP | H10202153 | A | 8/1998 |
| JP | 2000511587 | | 9/2000 |
| JP | 2000511968 | | 9/2000 |
| JP | 2002530712 | A | 9/2002 |
| JP | 2003329824 | A | 11/2003 |
| JP | 2003335880 | | 11/2003 |
| JP | 2004510013 | A | 4/2004 |
| JP | 2006176742 | | 7/2006 |
| JP | 2006347167 | A | 12/2006 |
| JP | 2007011309 | | 1/2007 |
| JP | 2007232958 | A | 9/2007 |
| JP | 2008088317 | | 4/2008 |
| JP | 2008532069 | | 8/2008 |
| JP | 2009520844 | | 5/2009 |
| JP | 2010247369 | | 11/2010 |
| JP | 2011221376 | | 11/2011 |
| JP | 2012097135 | | 5/2012 |
| JP | 2012177938 | | 9/2012 |
| JP | 2013505354 | | 2/2013 |
| JP | 2013050524 | A | 3/2013 |
| JP | 2013242396 | | 12/2013 |
| JP | 2016072422 | A | 5/2016 |
| KR | 10-20060011158 | | 2/2006 |
| KR | 10-2007-0015416 | A1 | 2/2007 |
| KR | 10-20080060707 | | 7/2008 |
| KR | 10-20090025217 | | 3/2009 |
| KR | 20100081163 | A | 7/2010 |
| WO | 1990010246 | | 7/1990 |
| WO | 00/31571 | | 6/2000 |
| WO | 2003077019 | | 9/2003 |
| WO | 2004016441 | | 2/2004 |
| WO | 2004/072186 | | 8/2004 |
| WO | 2006007742 | | 1/2006 |
| WO | 2008061930 | | 5/2008 |
| WO | 2012078820 | | 6/2012 |
| WO | 2013079542 | | 6/2013 |
| WO | 2014085473 | | 6/2014 |
| WO | 2014/410427 | | 9/2014 |
| WO | 2016060173 | A1 | 4/2016 |
| WO | 2016076333 | | 5/2016 |

OTHER PUBLICATIONS

Quantum Dots, Sigma-Aldrich (RTM), retrieved from "https://www.sigmaaldrich.com/technical-documents/articles/materials-science/nanomaterials/quantum-dots.html" on Mar. 12, 2020. (Year: 2020).*

Quantum dot, Wikipedia (RTM), Retrieved from "https://en.wikipedia.org/w/index.php?title=Quantum_dot&oldid=942721024" on Mar. 12, 2020. (Year: 2020).*

Modaflow (RTM) Resin, Technical Datasheet, Version 5.0, Allnex, Jun. 18, 2020. (Year: 2020).*

BYK-361 N, Technical Data Sheet, BYK (RTM) Additives & Instruments, Dec. 2012. (Year: 2012).*

Paint Additives, Product Guide L-G 1, BYK (RTM) Additives & Instruments, Feb. 2009. (Year: 2009).*

BYK-306, Technical Data Sheet, BYK (RTM) Additives & Instruments, Nov. 2012. (Year: 2012).*

BASF High lights! Radiation curing with resins and photoinitiators for industrial coatings and graphic arts: Laromer®, Irgacure®, Lucirin®, Darocur®, originally retrieved from BASF.com on Aug. 6, 2014. (Year: 2014).*

Machine translation of EP0033896A1, published Aug. 1981. (Year: 1981).*

Kobayashi, Toyo Aluminium K.K. Product Report Colored aluminium paste, Fall 2012. (Year: 2012).*

Arceneaux, et al., "Mitigation of Oxygen Inhibition in UV LED, UVA, and Low Intensity UV Cure", RadTech 2014, 11 pages.

Husar, et al., "The formulator's guide to anti-oxygen inhibition additives", Progress in Organic Coatings 77, 2014, p. 1789-1798, 10 pages.

Penzel, E. "Polyacrylates", In Ullmann's Encyclopedia of Industrial Chemistry, year 2000, vol. 28, pp. 515-536.

Cohen, et al., "Modern Coating and Drying Technology", John Wiley & Sons, Inc., Oct. 1999, 6 pages.

"Office Action, China Application No. 202011447471.9", mailed date Sep. 30, 2022, 9 pages including portion English translation cited as the concise statement of relevance regarding NPL reference Cohen.

"200 Questions on UV Optical Technology", Gao Jing, p. 33, Printing Industry Press, Jan. 2012, 17 pages (relevant p. 33).

"Acid-catalyzed synthesis of butane-1, 2-propanediol condensation agent using phosphorus supported on silica", Yang Shui-Jin et al., Chemical Intermediate, No. 11, Nov. 15, 2012, 3 pages.

"New Technology of Modern Coating Technology", Liu Guojie, (relevant p. 231), China Light Industry Press, Apr. 2000, 32 pages.

"Study on influences of oxygen for photochemical solidification adhesive solidification", Wang Zhengping, Chemical Engineer, vol. 107, No. 8, Aug. 30, 2004, 10 pages.

(56) References Cited

OTHER PUBLICATIONS

Du Zhenxia et al., "Research on surface modification of nano-calcium carbonate and its application in coatings", Journal of Beijing University of Chemical Technology, vol. 26, No. 2, Jun. 30, 1999, 8 pages.
Hubei Paper, No. 4, "Study on the Effect of Nanoscale Calcium Carbonate on the Properties of Coatings and Papers", Zhang Heng et al., Dec. 30, 2003, 9 pages.
IM&P, "Chemical Minerals and Processing", No. 5, May 25, 2003, 4 pages.
Li Huachun et al., "The inhibitory effect of oxygen in the photocuring process of coatings", Modern Plastics Processing and Application, vol. 14, No. 4, Aug. 15, 2002, 12 pages.
Liu Guojie et al., "Some new developments in research and development of acrylic resins and coatings", Monographs and Reviews, vol. 15, No. 8, Aug. 20, 2012, 18 pages.
Liu Junhua, et al., "Synthesis of multifunctional acrylated pilyester and its photocuring", Thermosetting Resin, vol. 18, No. 1, Jan. 30, 2003, 13 pages.
Polymer Bulletin, No. 9, Sun Jiazhen, et al., Aug. 28, 2015, 37 pages.
Progress in Chemistry, vol. 23, No. 11, Chen Bingkun et al., Nov. 24, 2011, 33 pages.

* cited by examiner

HIGH CHROMATICITY PIGMENT FLAKES AND FOILS

FIELD OF THE INVENTION

The present disclosure generally relates to flakes and/or foils that can be used as security features in currency. The security features can (i) include a strong color, (ii) be goniochromatic, and (iii) have a high flop, i.e., be specular and have a metallic appearance that can vary from bright to dark as an angle varies. Methods of making the flakes or foils are also disclosed.

BACKGROUND OF THE INVENTION

Flakes or foils can be used as a security feature of currency and consumer applications with enhanced optical properties. Unfortunately, present manufacturing methods, such as vapor deposition processes, require expensive and complex equipment to make the flakes and/or foils. Cheaper methods that presently exist provide poor quality pigments for use as security features. Additionally, the deposition of polymer thin films by evaporation results in poor interlayer adhesion. Further, working in a vacuum negatively impacts the productivity of this equipment over time. Moreover, there is extensive non-productive time related to maintenance of this equipment, which requires pumping and venting the chambers. Furthermore, the type of materials available for use in making flakes or foils is limited to only those that can be vaporized under low pressure, thereby eliminating most organic materials.

SUMMARY OF THE INVENTION

In an aspect, there is disclosed an article that can include at least one first metallic layer, at least one dielectric layer; and at least one second metallic layer. The at least one dielectric layer includes at least one of (i) a photo-initiator, (ii) an oxygen inhibition mitigation composition, (iii) a leveling agent, and (iv) a defoamer.

In an aspect, the at least one dielectric layer is deposited on the at least one first metallic layer and the at least second metallic layer is deposited on the at least one dielectric layer.

In another aspect, the article also includes a substrate. The at least one first metallic layer is deposited on the substrate, the at least one dielectric layer is deposited on the at least one first metallic layer, and the at least one second metallic layer is deposited on the at least one dielectric layer.

In a further aspect, the article includes a substrate. In this aspect, the at least one second metallic layer is deposited on the substrate, the at least one dielectric layer is deposited on the at least one second metallic layer, and the at least one first metallic layer is deposited on the at least one dielectric layer.

In a further aspect, the article includes a substrate. In this aspect, the at least one first metallic layer includes two first metallic layers, one deposited on each surface of the substrate. At least one dielectric layer is two dielectric layer, one deposited on each of the first two metallic layers, respectively. The at least one second metallic layer comprises two second metallic layers, one deposited on each of the two dielectric layers, respectively.

In yet another aspect, the at least one first metallic layer includes a first surface and a second surface, wherein the at least one dielectric layer comprises two dielectric layers deposited on the first and second surfaces of the first metallic layer, respectively, and wherein the at least one second metallic layer comprises two second metallic layers deposited on each of the two dielectric layers, respectively.

In an aspect, the article also includes a magnet containing layer. The magnet containing layer includes a first surface and a second surface, wherein the at least one first metallic layer comprises two first metallic layers deposited on the first and second surfaces of the magnet containing layer, respectively, wherein the at least one dielectric layer comprises two dielectric layers deposited on each of the two first metallic layers, respectively, and wherein the at least one second metallic layer comprises two second metallic layers deposited on each of the two dielectric layers, respectively.

In a further aspect, there is disclosed a method for manufacturing an article. The method includes depositing on a substrate a first metallic containing layer; depositing on the first metallic layer a dielectric layer; and depositing on the dielectric layer a second metallic layer; wherein the dielectric layer is deposited using a liquid coating process In an aspect, the substrate comprises a release layer. The first metallic layer is an absorber layer and the second metallic layer is a reflector layer. The method further comprises depositing on the reflector layer a second dielectric layer; and depositing on the second dielectric layer a second absorber layer, wherein the second dielectric layer is deposited using the liquid coating process.

In an aspect, the substrate comprises a release layer. The first metallic layer is an absorber layer and the second metallic layer is a reflector layer. The method further comprises depositing on the reflector layer a magnet containing layer; depositing on the magnet containing layer a second reflector layer; depositing on the second reflector layer a second dielectric layer; and depositing on the second dielectric layer a second absorber layer, wherein the second dielectric layer is deposited using the liquid coating process.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

BRIEF DESCRIPTION OF THE DRAWINGS

The present disclosure in its several aspects and embodiments can be more fully understood from the detailed description and the accompanying drawings, wherein.

DETAILED DESCRIPTION OF THE INVENTION

It is to be understood that both the foregoing general description and the following detailed description are exemplary and explanatory only, and are intended to provide an explanation of various embodiments of the present teachings.

In its broad and varied embodiments, disclosed herein are articles and a method of manufacturing the articles used as a security feature of currency and consumer applications with enhanced optical properties.

In an aspect, the article can include at least one first metallic layer, at least one dielectric layer, and at least one second metallic layer. The at least one dielectric layer can include at least one of (i) a photo-initiator, (ii) an oxygen inhibition mitigation composition, (iii) a leveling agent, and (iv) a defoamer. In one example, the at least one first metallic layer can be one of a reflector layer or an absorber layer and the at least one second metallic layer can be one of the reflector layer or the absorber layer.

In another aspect, the at least one dielectric layer can be deposited on the at least one first metallic layer and the at least one second metallic layer can be deposited on the at least one dielectric layer.

The terms "metallic" or "metallic layer" used herein, unless otherwise stated, are intended to include all metals, metal alloys, pure metal or metal alloy containing materials, compound, compositions, and/or layers.

FIGS. 1-6 illustrate various articles, such as foils and flakes, according to various examples of the present disclosure. Although, these Figures illustrate specific layers in specific orders, one of ordinary skill in the art would appreciate that the articles 10, 10', 10', and 10''' can include any number of layers in any order. Additionally, the composition of any particular layer can be the same or different from the composition of any other layer. It is also envisioned that the articles disclosed herein can include additional layers, such as intermediate layers or intervening layers. It is also envisioned that the layers of the articles may be surfaced modified, such as by oxidation.

Figure 1:
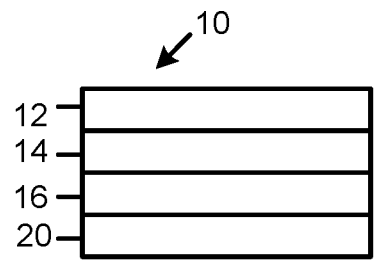
FIG. 1 is a cross-sectional view of an article in a form of a foil, according to an example of the present disclosure.
Figure 2:
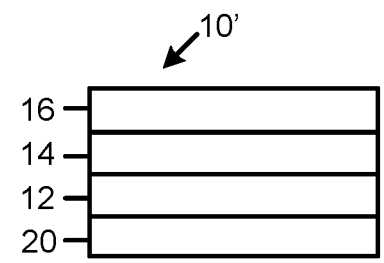
FIG. 2 is a cross-sectional view of an alternative article in a form of a foil, according to another example of the present disclosure.

In another aspect, as shown in FIGS. 1 and 2, the articles 10 and 10' are in a form of a foil, which are asymmetric, and can be cut into narrow strips. In one aspect, as shown in FIG. 1, the article 10 can be designed such that the first metallic layer 16 can be deposited on the substrate 20 wherein the first metallic layer 16 cannot be etched. For example, the article 10 can include a substrate 20, a first metallic layer 16, which can be a reflector layer, deposited on the substrate 20, and a dielectric layer 14 can be deposited on the first metallic layer 16. Alternatively or additionally, another layer can be on top of the metallic layer 16, for example, a metal oxide layer. In this case, the dielectric layer 14 can be deposited on the "another layer" Fe (e.g., the metal oxide layer). Additionally, a second metallic layer 12, which can be a reflector layer, can be deposited on the dielectric layer 14. Alternatively or additionally, another layer can be on top of the dielectric layer 14. In this case, the second metallic layer 12 can be deposited on this "another layer."

In another aspect, as shown in FIG. 2, the article 10' can be designed such that the first metallic layer 16 is exposed on the surface, enabling etching, such as chemical etching, for example in an alkaline bath or acid bath. The article 10' can include a substrate 20, a second metallic layer 12, which can be an absorber layer, deposited on the substrate 20, and a dielectric layer 14 deposited on the second metallic layer 12. Additionally, a first metallic layer 16, which can be a reflector layer, can be deposited on the dielectric layer 14. In this configuration, the first metallic layer 16 can be etched, such as chemically etched, to enable patterning a colored/non-colored effect along the article 10'.

As stated above, the dielectric layer 14 can include at least one of (i) a photo-initiator, (ii) an oxygen inhibition mitigation composition, (iii) a leveling agent, and (iv) a defoamer. For example, the dielectric layer 14 can include at least one of a phosphineoxide, and at least one acrylate oligomer.

The substrate 20 can be any suitable material that can receive the deposited layers. Non-limiting examples of suitable substrate materials include polymer web, such as polyethylene terephthalate (PET), glass, silicon wafers, etc. The substrate 20 can vary in thickness, but can range for example from about 2 μm to about 100 μm, and as a further example from about 10 to about 50 μm.

Figure 3:
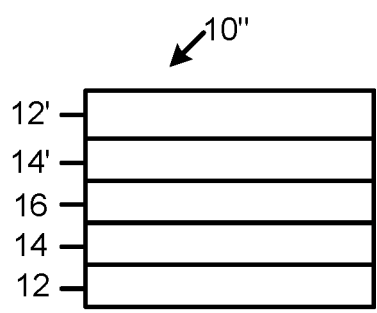
FIG. 3 is a cross-sectional view of an article in a form of a flake, according to an example of the present disclosure.
Figure 4:
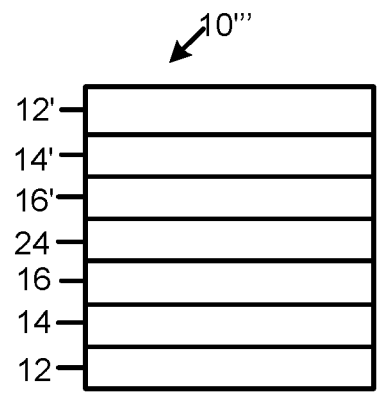
FIG. 4 is a cross-sectional view of an alternative article in a form of a flake, according to an example of the present disclosure.

In an aspect, shown in FIGS. 3 and 4, the articles 10'' and 10''' can be in a form of a flake that can be used on an object or a substrate, can be combined with a liquid medium to form a color shifting colorant, or can be used as a security feature for currency. Some attributes common to use of the articles 10'' and 10''' on an object and a currency can include high chromaticity (or strong color), color change with respect to viewing angle (also known as goniochromaticity or iridescence), and high flop (a specular and metallic appearance that varies from bright to dark as angle varies).

As shown in FIG. 3, the article 10'' can be in a form of a flake and can include a first metallic layer 16 having a first surface and a second surface, a dielectric layer 14, 14' with a refractive index of from about 1.2 to about 2.6 deposited on each of the first and second surfaces of the first metallic layer 16, and a second metallic layer 12, 12' deposited on each of the dielectric layers 14, 14', respectively. Moreover, each of the dielectric layers 14, 14' can include at least one of (i) a photo-initiator, (ii) an oxygen inhibition mitigation composition, (iii) a leveling agent, and (iv) a defoamer. In this particular example, the first metallic layer 16 can be a reflector layer and the second metallic layer 12, 12' can be an absorber layer.

With regard to FIG. 4, there is disclosed an article 10''' comprising a magnet containing layer 24 having a first surface and a second surface, at least one first metallic layer, such as first metallic layers 16 and 16', deposited on each of the first and second surfaces of the magnet containing layer 24, respectively. Additionally, at least one dielectric layer, such as dielectric layers 14 and 14' can be deposited on each of the first metallic layers 16 and 16', respectively. Furthermore, at least a second metallic layers, such as second metallic layers 12 and 12' can be deposited on each of the dielectric layers 14 and 14', respectively. In this particular example, the first metallic layer 16, 16' can be a reflector layer and the second metallic layer 12, 12' can be an absorber layer The magnet containing layer 24 can include magnetic permeable, magnetic orientable materials, magnetic materials, and combinations thereof. A magnetic material, such as ferromagnetic and ferrimagnetic materials, includes but is not limited to, nickel, cobalt, iron, gadolinium, terbium, dysprosium, erbium, and their alloys or oxides. For example, a cobalt nickel alloy can be employed, with the cobalt and nickel having a ratio by weight of about 80% and about 20%, respectively. This ratio for each of these metals in the cobalt nickel alloy can be varied by plus or minus about 10%. Other examples of alloys include, but are not limited to, Fe/Si, Fe/Ni, FeCo, Fe/Ni/Mo, Fe/Cr, Ni/Cr, and combinations thereof. In an aspect, the magnet containing layer 24 can include a polymer containing iron oxide particles. Hard magnetics of the type $SmCo_5$, $NdCo_5$, $Sm_2Co_{17}$, $Nd_2Fe_{14}B$, $Sr_6Fe_2O_3$, $TbFe_2$, Al—Ni—Co, and combinations thereof, can also be used as well as spinel ferrites of the type $Fe_3O_4$, $NiFe_2O_4$, $MnFe_2O_4$, $CoFe_2O_4$, or garnets of the type YIG or GdIG, and combinations thereof. In an aspect, the magnetic material may be ferritic stainless steel. The magnetic material can be selected for its reflecting or absorbing properties as well as its magnetic properties. The magnet containing layer 24 may be formed by a material having magnetic and non-magnetic particles, or magnetic particle within non-magnetic medium, for example cobalt-doped zinc oxide film deposited using the sol-gel technology.

Although this broad range of magnetic materials can be used, "soft" magnets can be used in an aspect. As used herein, the term "soft magnets" refers to any material exhibiting ferromagnetic properties but having a remanence that is substantially zero after exposure to a magnetic force. Soft magnets can show a quick response to an applied magnetic field, but have very low (coercive fields (Hc) =0.05-300 Oersted (Oe)) or zero magnetic signatures, or retain very low magnetic lines of force after the magnetic field is removed. Similarly, as used herein, the term "hard magnets" (also called permanent magnets) refers to any material that exhibits ferromagnetic properties and that has a long lasting remanence after exposure to a magnetizing force. A ferromagnetic material is any material that has permeability substantially greater than 1 and that exhibits magnetic hysteresis properties. In an aspect, any magnetic material can be used in the magnet containing layer 24 so long as the material enables the orienting of the flake 10'''.

The magnet containing layer 24 can have a thickness ranging from about 10 nm to about 100 nm, for example from about 35 nm to about 45 nm, and as a further example from about 40 nm. The magnet containing layer 24 can be deposited to a thickness so that it is substantially opaque. In an aspect, the magnet containing layer 24 can be deposited to a thickness so that it is not substantially opaque.

The magnet containing layer 24 can be formed using physical vapor deposition techniques, such as sputtering including magnetron sputtering; thermal evaporation; electron beam evaporation; and cathodic arc evaporation. In an aspect, the magnet containing layer 24 can also be formed using a liquid coating process as described herein in a manner similar to forming a dielectric layer 14, 14'.

For each example shown in FIGS. 1-4, the materials for the first metallic layer 16, 16' can include metals and/or metal alloys. In one example, the materials for the first metallic layer 16, 16' can include any materials that have reflective characteristics. An example of a reflective material can be aluminum, which has good reflectance characteristics, is inexpensive, and easy to form into or deposit as a thin layer. However, other reflective materials can also be used in place of aluminum. For example, copper, silver, gold, platinum, palladium, nickel, cobalt, niobium, chromium, tin, and combinations or alloys of these or other metals can be used as reflective materials. In an aspect, the material for the first metallic layer 16 can be a white or light colored metal. Other useful reflective materials include, but are not limited to, the transition and lanthanide metals and combinations thereof.

The thickness of the first metallic layer 16, 16' can range from about 20 nm to about 150 nm, although this range should not be taken as restrictive. For example, the lower limit of about 20 nm can be selected for a material such as aluminum so that the aluminum is of a minimum optical density of about 0.5 at a wavelength of about 550 nm. Other reflector materials may justify higher or lower minimum thicknesses in order to obtain a sufficient optical density or achieve the desired effect. The upper limit of about 150 nm, may also be higher or lower depending on the desired effect and the materials used.

In one aspect, the thickness of the first metallic layer 16, 16' can range from about 10 nm to about 160 nm for example, from about 15 nm to about 150 nm, from about 20 nm to about 140 nm, from about 25 nm to about 130 nm, from about 30 nm to about 120 nm, from about 40 nm to about 110 nm, or from about 50 nm to about 100 nm, such as from about 60 nm to about 90 nm or from about 70 nm to about 80 nm.

In one aspect, as shown in FIG. 3, the dielectric layers 14, 14' can be disposed on each side of the first metallic layer 16, such as a first surface and a second surface. In another aspect, as shown in FIG. 4, the dielectric layers 14 and 14' can be deposited on the first metallic layers 16 and 16', respectively. Each of these dielectric layers 14 and 14' can include a refraction index in a range of from about 1.2 to about 2.6, for example about 1.5. In other aspects, the dielectric layer 14 can be deposited on the first metallic layer 16, as shown in FIG. 1, or on the second metallic layer 12, as shown in FIG. 2.

The overall thickness of the dielectric layer 14, 14' can be from about 2 nm or less to about 3000 nm or more, for example, from about 50 nm to about 1000 nm, such as from about 100 nm to about 600 nm. The thickness of the dielectric layer 14, 14' can be used to determine the overall color.

In each aspect, as shown, for example in FIGS. 1-4, the dielectric layer 14, 14' can be a transparent clear layer, can be a transparent colored layer, or can be a colored layer. The performance of the dielectric layer 14, 14' can be determined based upon the selection of materials present in the dielectric layer 14, 14'. It is believed that the dielectric layer 14, 14' can achieve high performance in transmission, reflection, and absorption of light based upon the composition of the dielectric layer 14, 14'. In an aspect, the dielectric layer 14, 14' can include a composition that allows for a wider range of materials configured to increase the control of the optical performance of the dielectric layer 14, 14'. In an aspect, the dielectric layer 14, 14' can improve at least one of the following properties: flake handling, corrosion, alignment, and environmental performance of a metal layer.

The dielectric layer 14, 14' can include a composition having at least one of (i) a photo-initiator, (ii) an oxygen inhibition mitigation composition, (iii) a leveling agent, and (iv) a defoamer.

The oxygen inhibition mitigation composition can be used to mitigate the oxygen inhibition of the free radical process. The molecular oxygen can quench the triplet state of a photoinitiator/sensitizer or it can scavenge the free radicals resulting in reduced coating properties and/or uncured liquid surfaces. The oxygen inhibition mitigation composition can reduce the oxygen inhibition or can improve the cure of any dielectric layer 14, 14'.

The oxygen inhibition composition can comprise more than one compound. The oxygen inhibition mitigation composition can comprise at least one acrylate, for example at least one monomer and at least one acrylate oligomer. In an aspect, the oxygen inhibition mitigation composition can comprise at least one acrylate monomer and two acrylate oligomers. Non-limiting examples of an acrylate for use in the oxygen inhibition mitigation composition can include acrylates; methacrylates; epoxy acrylates, such as modified epoxy acrylate; polyester acrylates, such as acid functional polyester acrylates, tetra functional polyester acrylates, modified polyester acrylates, and bio-sourced polyester acrylates; polyether acrylates, such as amine modified polyether acrylates including amine functional acrylate co-initiators and tertiary amine co-initiators; urethane acrylates, such aromatic urethane acrylates, modified aliphatic urethane acrylates, aliphatic urethane acrylates, and aliphatic allophanate based urethane acrylates; and monomers and oligomers thereof. In an aspect, the oxygen inhibition mitigation composition can include at least one acrylate oligomer, such as two oligomers. The at least one acrylate oligomer can be selected/chosen from a polyester acrylate and a polyether acrylate, such as a mercapto modified polyester acrylate and an amine modified polyether tetraacrylate. The oxygen inhibition mitigation composition can also include at least one monomer, such as 1,6-hexanediol diacrylate. The oxygen inhibition mitigation composition can be present in the composition of the dielectric layer 14, 14' in an amount ranging from about 5% to about 95%, for example from about 10% to about 90%, and as a further example from about 15% to about 85% by weight relative to the total weight of the composition of the dielectric layer 14, 14'.

In an aspect, the composition of the dielectric layer 14, 14' can include at least one photoinitiator, such as two photoinitiators, or three photoinitiators. The photoinitiator can be used for shorter wavelengths. The photoinitiator can be active for actinic wavelength. The photoinitiator can be a Type 1 photoinitiator or a Type II photoinitiator. The composition can include only Type I photoinitiators, only Type II photoinitiators, or a combination of both Type I and Type II photoinitiators. The photoinitiator can be present in the composition of the dielectric layer 14, 14' in an amount ranging from about 0.25% to about 15%, for example from about 0.5% to about 10%, and as a further example from about 1% to about 5% by weight relative to the total weight of the composition of the dielectric layer 14, 14'.

The photoinitiator can be a phosphineoxide. The phosphineoxide can include, but is not limited to, a monoacyl phosphineoxide and a bis acyl phosphine oxide. The mono acyl phosphine oxide can be a diphenyl (2,4,6-trimethylbenzoyl)phosphineoxide, The bis acyl phosphine oxide can be a bis (2,4,6-trimethylbenzoyl)phenylphosphineoxide. In an aspect, at least one phosphineoxide can be present in the composition of the dielectric layer 14, 14'. For example, two phosphineoxides can be present in the composition of the dielectric layer 14, 14'.

A sensitizer can be present in the composition of the dielectric layer 14, 14' and can act as a sensitizer for Type 1 and/or a Type II photoinitiators. The sensitizer can also act as a Type II photoinitiator. In an aspect, the sensitizer can be present in the composition of the dielectric layer 14, 14' in an amount ranging from about 0.05% to about 10%, for example from about 0.1% to about 7%, and as a further example from about 1% to about 5% by weight relative to the total weight of the composition of the dielectric layer 14, 14'. The sensitizer can be a thioxanthone, such as 1-chloro-4-propoxythioxanthone.

In an aspect, the dielectric layer 14, 14' can include a leveling agent. The leveling agent can be a polyacrylate. The leveling agent can eliminate cratering of the composition of the dielectric layer 14, 14'. The leveling agent can be present in the composition of the dielectric layer 14, 14' in an amount ranging from about 0.05% to about 10%, for example from about 1% to about 7%, and as a further example from about 2% to about 5% by weight relative to the total weight of the composition of the dielectric layer 14, 14'.

The dielectric layer 14, 14' can also include a defoamer. The defoamer can reduce surface tension. The defoamer can be a silicone free liquid organic polymer. The defoamer can be present in the composition of the dielectric layer 14, 14' in an amount ranging from about 0.05% to about 5%, for example from about 0.2% to about 4%, and as a further example from about 0.4% to about 3% by weight relative to the total weight of the composition of the dielectric layer 14, 14'.

The dielectric layer 14, 14' can further include at least one additive, such as a wetting aid, an adhesion promoter, an antioxidant, an ultraviolet stabilizer, a secondary crosslinker, a surfactant, IR absorbers, a dye, a pigment, and a mixture thereof. In an aspect, the antioxidant can be present in the composition of the dielectric layer 14, 14' in an amount ranging from about 25 ppm to about 5% by weight.

The composition of the dielectric layer 14, 14' can further include nanosized particles to aid and to adjust the refractive index of the dielectric layer 14, 14'. The nanosized particles can include, but are not limited to dyes and pigments, such as phthalocyanines, and quinacridones; organic and metalorganic materials having a high value of refractive index (n>1.8 at wavelength of about 550 nm); metal oxides, such as $TiO_2$, $ZrO_2$, $In_2O_3$, $In_2O_3$—$SnO$, $SnO_2$, $Fe_xO_y$ (wherein x and y are each independently integers greater than 0), and $WO_3$; metal sulfides, such as ZnS, and $Cu_xS_y$ (wherein x and y are each independently integers greater than 0); chalcogenides, quantum dots, metal nanoparticles; carbonates; fluorides; and mixtures thereof.

The composition of the dielectric layer 14, 14' can have a solids content ranging from about 0.01% to about 100%, for example from about 0.05% to about 80%, and as a further example from about 1% to about 30%. In some aspects the solids content may be greater than 3%. In some aspects, the composition of the dielectric layers 14, 14' can have a solids content ranging from about 3% to about 100%, for example from about 4% to 50%.

The dielectric layer 14, 14' can have a refractive index of greater or less than about 1.5. For example, the dielectric layer 14, 14' can have a refractive index of from about 1.2 to about 2.6, such as about 1.5. The refractive index of a dielectric layer 14, 14' can be selected to provide a degree of color travel required wherein color travel can be defined as the change in hue angle measured in L*a*b* color space with the viewing angle.

The dielectric layer 14, 14' can include an optical thickness variation of less than about 5%. In an aspect, the dielectric layer 14, 14' can include an optical thickness variation of less than about 3% across the layer. In an aspect, the dielectric layer 14, 14' can include an optical thickness variation of less than about 1% across the layer. Articles in a form of a foil used to produce security threads can require greater uniformity, i.e., less optical thickness variation, than foils used to produce pigment.

The dielectric layer 14, 14' can have a thickness ranging from about 1 nm to about 1500 nm, for example from about 10 nm to about 1500 nm, as a further example from about 20 nm to about 1000 nm, and as an additional example from about 40 nm to about 800 nm, such as from about 100 nm to about 600 nm. In an aspect, the dielectric layer 14, 14' can have less than about 1% variation in optical thickness across the layer having a thickness of 50 nm.

The article 10, 10', 10", or 10"' can include at least one dielectric layer, such as a first dielectric layer 14, a second dielectric layer 14', a third dielectric layer 14", a fourth dielectric layer 14'", and etc. If more than one dielectric layer 14, 14' is present in an article 10, 10', 10", or 10'", each dielectric layer may be independent in terms of their respective compositions and physical properties, but will function similarly. For example, a first dielectric layer 14 can have a composition with a first refractive index, but a second dielectric layer 14' in the same article 10" or 10'" can have a different composition with a different refractive index. As another example, a first dielectric layer 14 can have a composition at a first thickness, but the second dielectric layer 14' may have the same composition at a second thickness different from the first thickness.

The second metallic layer 12, 12' can be disposed on the dielectric layer 14, as shown in FIG. 1 or can be disposed on the substrate 20, as shown in FIG. 2. Alternatively, referring to FIGS. 3 and 4, each of the second metallic layers 12, 12' can be disposed on its corresponding dielectric layers 14, 14'. No matter what the configuration may be, the second metallic layer 12, 12' can include metals or metal alloys. In one example, the materials for the second metallic layer 12, 12' can include any absorber material, including both selective absorbing materials and nonselective absorbing materials. For example, the second metallic layer 12, 12' can be formed of nonselective absorbing metallic materials deposited to a thickness at which the absorber layer is at least partially absorbing, or semi-opaque. An example of a nonselective absorbing material can be a gray metal, such as chrome or nickel. An example of a selective absorbing material can be copper or gold. In an aspect, the absorbing material can be chromium. Non-limiting examples of suitable absorber materials include metallic absorbers such as chromium, aluminum, silver, nickel, palladium, platinum, titanium, vanadium, cobalt, iron, tin, tungsten, molybdenum, rhodium, niobium and various combinations, mixtures, compounds, or alloys of the above absorber materials that may be used to form the second metallic layer 12, 12'.

Examples of suitable alloys of the above absorber materials can include Inconel (Ni—Cr—Fe), stainless steels, Hastalloys (Ni—Mo—Fe; Ni—Mo—Fe—Cr; Ni—Si—Cu) and titanium-based alloys, such as titanium mixed with carbon (Ti/C), titanium mixed with tungsten (Ti/W), titanium mixed with niobium (Ti/Nb), and titanium mixed with silicon (Ti/Si), and combinations thereof. Other examples of suitable compounds for the second metallic layer 12, 12' include titanium-based compounds such as titanium silicide (TiSi2), titanium boride (TiB2), and combinations thereof. Alternatively, the second metallic layer 12, 12' can be composed of a titanium-based alloy disposed in a matrix of Ti, or can be composed of Ti disposed in a matrix of a titanium-based alloy. For example, as shown in FIGS. 1-4, the second metallic layer 12, 12' can include chromium.

The second metallic layer 12, 12' can also be formed of a magnetic material, such as a cobalt nickel alloy. This can simplify the manufacture of a magnetic color shifting device or structure by reducing the number of materials required.

The second metallic layer 12, 12' can be formed to have a physical thickness in the range from about 1 nm to about 50 nm, such as from about 5 nm to about 10 nm, depending upon the optical constants of the absorber layer material and the desired peak shift. The second metallic layer 12, 12' can each be composed of the same material or a different material, and can have the same or different physical thickness for each layer.

There is also a disclosed a method for manufacturing an article as described herein. The method can comprise depositing on a substrate 20 a first metallic layer 16, depositing on the first metallic layer 16 a dielectric layer 14, and depositing on the dielectric layer 14 a second metallic layer 12; wherein the dielectric layer is deposited using a liquid coating process.

With respect to the aspect shown in FIG. 1, in practice, to create article 10, a first metallic layer 16, such as a reflector, can be deposited on the substrate 20, by any known conventional deposition processes, such as physical vapor deposition (PVD). The dielectric layer 14 can then be deposited on the first metallic layer 16 by a liquid coating process, such as a slot die process. Once the dielectric layer 14 has been deposited and cured on the first metallic layer 16, then the second metallic layer 12, such as an absorber layer, can be deposited on the dielectric layer 14 by a conventional deposition process. With respect to FIG. 2, a second metallic layer 12, such as an absorber layer, can be deposited on the substrate 20 by the same method described above. The dielectric layer 14 can then be deposited on the second metallic layer 12 via a liquid coating process, and a first metallic layer 16, such as a reflector layer, can then be deposited on the dielectric layer 14.

In the aspects shown in FIGS. 1 and 2, the articles 10, 10', including the substrate 20 can be cut into narrow strips and be used as a security feature in currency. Moreover, in the aspect shown in FIG. 2, the first metallic layer 16 can be chemically etched in an alkaline bath. When combined with a patterned resist, this aspect can enable patterning a colored/non-colored effect along the article 10'.

Figure 5:
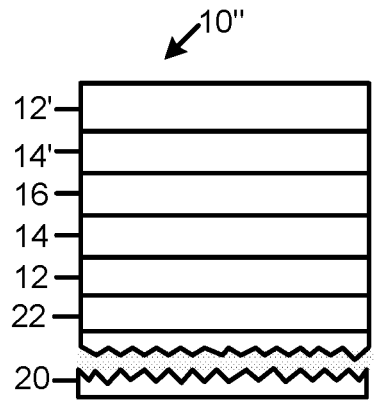
FIG. 5 is a cross-sectional view of an article prior to being released from a substrate having a release layer, according to an example of the present disclosure.

A similar general process described above also applies to the aspects directed to FIG. 3. In practice, to create flake 10", a second metallic layer 12, such as an absorber layer, can be deposited on the substrate 20 having a release layer 22, as shown in FIG. 5. The substrate 20 can be made of a flexible material. The second metallic layer 12 can be deposited onto the substrate 20 by PVD). Once the second metallic layer 12 has been deposited, the substrate 20 and the deposited second metallic layer 12 can be removed from the PVD apparatus. The substrate 20 and the deposited second metallic layer 12 can then be introduced to a liquid coating apparatus, such as a slot die apparatus, to deposit the dielectric layer 14 on the surface of the second metallic layer 12. Once the dielectric layer 14 has been deposited and cured, a first metallic layer 16 can then be deposited on the dielectric layer 14 by conventional deposition processes, such as PVD. The above process can then be repeated in a reverse order. For example, the dielectric layer 14' can be deposited on the surface of the first metallic layer 16 using a liquid coating process. Once the dielectric layer 14' has been cured, the substrate 20 and all of the deposited layers can be transferred to a conventional deposition process apparatus, such as a PVD apparatus to deposit a second metallic layer 12'.

In an aspect, the method can include that the first metallic layer 16 can be one of an absorber layer and a reflector layer and the second metallic layer 12, 12' can be one of the absorber layer and the reflector layer. In an aspect, the substrate 20 can comprise a release layer 22, the second metallic layer 12, 12' can be an absorber layer, and the first metallic layer 16 can be a reflector layer. In this aspect, as shown in FIG. 5, the method can include depositing on the substrate 20 a second metallic layer 12, depositing on the second metallic layer 12 a dielectric layer 14, and depositing on the dielectric layer 14 a first metallic layer 16. The method further includes depositing on the first metallic layer 16 a second dielectric layer 14', and depositing on the second dielectric layer 14' a second metallic layer 12'. The dielectric layers 14, 14' can be deposited using a liquid coating process.

Figure 6:
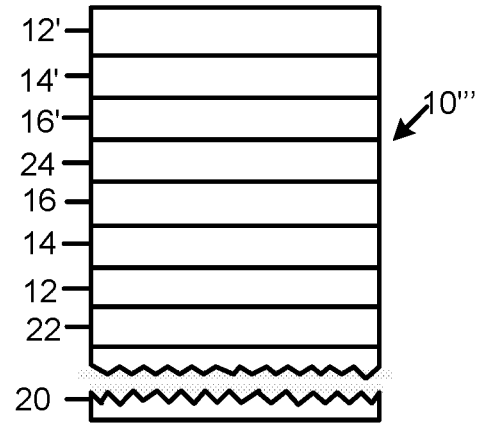
FIG. 6 is a cross-sectional view of an alternative article prior to being released from a substrate having a release layer, according to an example of the present disclosure.

The substrate 20 can then be released from the deposited layers to create the article 10", for example as shown in FIG. 5-6. In an aspect, the substrate 20 can be cooled to embrittle the associated release layer 22. In another aspect, the release layer could be embrittled for example by heating and/or curing with photonic or e-beam energy, to increase the degree of cross-linking, which would enable stripping. The deposited layers can then be stripped mechanically, such as sharp bending or brushing of the surface. The released and stripped layers can be ground into article 10" using known techniques.

In another aspect, the deposited layers can be transferred from the substrate 20 to another surface. The deposited layers can be punched or cut to produce large flakes with well-defined sizes and shapes.

In another aspect, there is disclosed a method wherein the substrate 20 comprises a release layer 22. The second metallic layer 12, 12' can be an absorber layer and the first metallic layer 16, 16' can be a reflector layer. In this aspect, as shown in FIG. 6, the method can include depositing on the substrate 20 including the release layer 22 a second metallic layer 12, and depositing on the second metallic layer 12 a dielectric layer 14. The method include depositing on the dielectric 14 a first metallic layer 16, and depositing on the first metallic layer 16 a magnet containing layer 24. The method can include depositing on the magnet containing layer 24 an additional first metallic layer 16' (a second reflector layer), depositing on the additional first metallic layer 16' a second dielectric layer 14'; and depositing on the second dielectric layer 14' an additional second metallic layer 12' (absorber layer). The dielectric layers 14, 14' can be deposited using the liquid coating process. The layers, other than the dielectric layers 14, 14', can be deposited using conventional techniques previously disclosed. Alternatively or additionally, the magnet containing layer 24 can also be deposited using a liquid coating process.

As stated above, the dielectric layer 14, 14' can be deposited by a liquid coating process, such as a slot die process. However, it was previously believed that liquid coating processes, such as a slot die process, could not operate stably at optical thicknesses, such as about 50 to about 700 nm. In particular, thin, wet films have commonly formed islands of thick areas where solids have been wicked away from the surrounding thin areas by capillary forces as solvents evaporate. This reticulated appearance is not compatible with optical coatings as the variable thickness can result in a wide range of optical path lengths, such as a wide range of colors resulting in a speckled/textured appearance, as well as reduced color uniformity of the optical coating and low chromaticity.

In an aspect of the present disclosure, the dielectric layer 14, 14' can be formed using a liquid coating process, such as a slot die process. In an aspect, the liquid coating process can include slot-bead, slide bead, slot curtain, slide curtain, in single and multilayer coating, and tensioned web slot. The liquid coating process can allow for the transfer of the composition of the dielectric layer 14, 14' at a faster rate as compared to other techniques, such as vapor deposition. Additionally, the liquid coating process can allow for a wider variety of materials to be used in the dielectric layer 14, 14' with a simple equipment set up. It is believed that the dielectric layer 14, 14' formed using the disclosed liquid coating process can exhibit improved optical performance.

Figure 7:
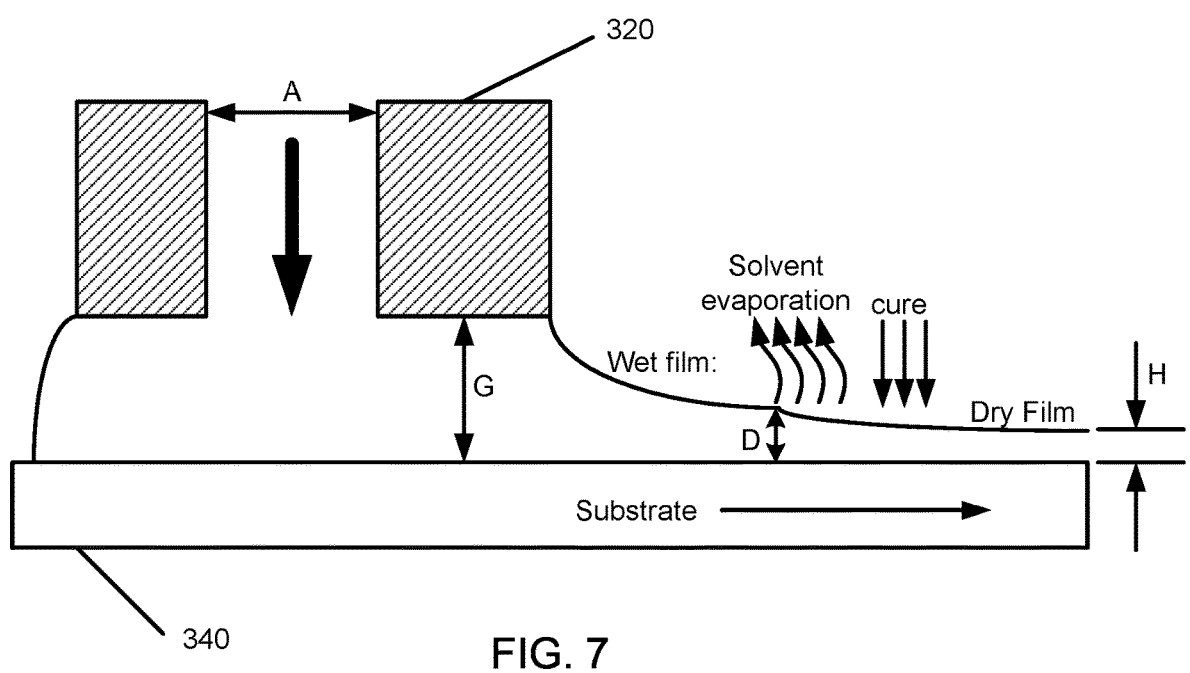
FIG. 7 is a cross-sectional view of a liquid coating process showing the stages of depositing a dielectric layer, according to an example of the present disclosure.

FIG. 7 illustrates the formation of the dielectric layer 14, 14' using a liquid coating process. The composition of the dielectric layer (a liquid coating composition) can be inserted into a slot die 320 and deposited on a substrate 340 resulting in a wet film. With reference to the processes disclosed above, the substrate 340 can include the substrate 20, with or without a release layer 22, and a deposited second metallic layer 12 as shown in FIGS. 2, 5, and 6; or the substrate 20 and a deposited first metallic layer 16 as shown in FIG. 1. In an aspect, the substrate 340 can be any combination of substrate 20 and/or deposited layers. The distance from the bottom of the slot die 320 to the substrate 340 is the slot gap G. As can be seen in FIG. 7, the liquid coating composition can be deposited at a wet film thickness D that is greater than a dry film thickness H. After the wet film has been deposited on the substrate 340, any solvent present in the wet film can be evaporated. The liquid coating process continues with curing of the wet film to result in cured, self-leveled dielectric layer 14, 14' having the correct optical thickness H (ranging from about 50 to about 700 nm). It is believed that the ability of the dielectric layer 14, 14' to self-level results in a layer having a reduced optical thickness variation across the layer. Ultimately, articles 10, 10', 10", or 10''' comprising the self-leveled dielectric layer 14, 14' can exhibit increased optical precision. For ease of understanding, the terms "wet film" and "dry film" will be used to refer to the composition at various stages of the liquid coating process that results in the dielectric layer 14, 14'.

The liquid coating process can comprise adjusting at least one of a coating speed and a slot gap G to achieve a wet film with a predetermined thickness D. The dielectric layer can be deposited having a wet film thickness D ranging from about 0.1 µm to about 500 µm, for example from about 0.1 µm to about 5 µm. A dielectric layer formed with a wet film thickness D in the disclosed range can result in a stable dielectric layer, i.e., without breaks or defects such as ribbing or streaks. In an aspect, the wet film can have a thickness of about 5 µm for a stable wet film using a slot die bead mode with a coating speed up to about 200 m/min. In another aspect, the wet film can have a thickness of about 6-7 µm for a stable wet film using a slot die curtain mode with a coating speed up to about 1200 m/min.

The liquid coating process can include a ratio of slot gap G to wet film thickness D of about 1 to about 100 at speeds from about 0.1 to about 1000 m/min. In an aspect, the ratio is about 9 at a coating speed of about 100 m/min. In an aspect, the ratio can be about 20 at a coating speed of about 50 m/min. The liquid coating process can have a slot gap G ranging from about 0 to about 1000 µm. A smaller slot gap G can allow for a reduced wet film thickness. In slot-bead mode higher coating speeds can be achieved with a wet film thickness greater than 10 µm.

The liquid coating process can have a coating speed ranging from about 0.1 to about 1000 m/min, for example from about 25 m/min to about 950 m/min, for example from about 100 m/min to about 900 m/min, and as a further example from about 200 m/min to about 850 m/min. In an aspect, the coating speed is greater than about 150 m/min, and in a further example is greater than about 500 m/min. In an aspect, the coating speed for a bead mode liquid coating process can range from about 0.1 m/min to about 600 m/min, and for example from about 50 to about 150 m/min. In another aspect, the coating speed for a curtain mode liquid coating process can range from about 200 m/min to about 1500 m/min, and for example from about 300 m/min to about 1200 m/min.

The wet film can comprise a solvent. Non-limiting examples of solvents can include acetates, such as ethyl acetate, propyl acetate, and butyl acetate; acetone; water; ketones, such as dimethyl ketone (DMK), methylethyl ketone (MEK), sec-butyl methyl ketone (SBMK), ter-butyl methyl ketone (TBMK), cyclopenthanon, and anisole; glycol derivatives, such as propylene glycol methyl ether, and propylene glycol methyl ether acetate; alcohols, such as isopropyl alcohol, and diacetone alcohol; esters, such as malonates; heterocyclic solvents, such as n-methyl pyrrolidone; hydrocarbons, such as toluene, and xylene; coalescing solvents, such as glycol ethers; and mixtures thereof. In an aspect, the solvent can be present in the composition of the dielectric layer in an amount ranging from about 0% to about 99.9%, for example from about 0.005% to about 99%, and as a further example from about 0.05% to about 90% by weight relative to the total weight of the composition the dielectric layer.

As shown in FIG. 7, the solvent can be evaporated from the wet film, such as before the wet film is cured. In an aspect, about 100%, for example about 99.9%, and as a further example about 99.8% of the solvent can be evaporated from the composition of the dielectric layer, prior to curing of the dielectric layer. In a further aspect, trace amounts of solvent can be present in a cured/dry dielectric layer.

In an aspect, a wet film having a greater original weight percent of solvent can result in a dry film having a reduced film thickness H. In particular, a wet film having a high weight percent of solvent and being deposited at a high wet film thickness D can result in a dielectric layer having a low dry film thickness H. It is important to note, that after evaporation of the solvent, the wet film remains a liquid thereby avoiding problems such as skinning, and island formation during the subsequent curing steps in the liquid coating process.

The dynamic viscosity of the wet film can range from about 0.5 to about 50 cP, for example from about 1 to about 45 cP, and as a further example from about 2 to about 40 cP. The viscosity measurement temperature is 25° C., the rheology was measured with an Anton Paar MCR 101 rheometer equipped with a solvent trap using a cone/plate 40 mm diameter with 0.3° angle at a gap setting of 0.025 mm.

In an aspect, the composition of the dielectric layer and the solvent can be selected so that the wet film exhibits Newtonian behavior for precision coating of the dielectric layers using the liquid coating process. The wet film can exhibit Newtonian behavior shear rates up to 10,000 s$^{-1}$ and higher. In an aspect, the shear rate for the liquid coating process can be 1000 s$^{-1}$ for a coating speed up to 25 m/min, for example 3900 s$^{-1}$ for a coating speed up to 100 m/min, and as a further example 7900 s$^{-1}$ for a coating speed up to 200 m/min. It will be understood that a maximum shear rate can occur on a very thin wet film, such as 1 μm thick. As the wet film thickness is increased, the shear rate can be expected to decrease, for example decrease 15% for a 10 μm wet film, and as a further example decrease 30% for a 20 μm wet film.

The evaporation of the solvent from the wet film can cause a change in viscosity behavior to pseudoplastic, which can be beneficial to achieve a precision dielectric layer. The dynamic viscosity of the deposited first and second dielectric layers, after any solvent has been evaporated, can range from about 10 cP to about 3000 cP, for example from about 20 cP to about 2500 cP, and as a further example from about 30 cP to about 2000 cP. When evaporating the solvent, if present, from the wet film there can be an increase in viscosity to the pseudoplastic behavior. The pseudoplastic behavior can allow for self-leveling of the wet film.

In an aspect, the method can include evaporating the solvent present in the wet film using known techniques. The amount of time required to evaporate the solvent can be dependent upon the speed of the web/substrate and the dryer capacity. In an aspect, the temperature of the dryer (not shown) can be less than about 120° C., for example less than about 100° C., and as a further example less than about 80° C.

The wet film deposited using a liquid coating process can be cured using known techniques. In an aspect, the wet film can be cured using ultraviolet light, visible light, infrared, or electron beam. Curing can proceed in an inert or ambient atmosphere. In an aspect, the curing step utilizes an ultraviolet light source having a wavelength of about 395 nm. The ultraviolet light source can be applied to the wet film at a dose ranging from about 200 mJ/cm$^2$ to about 1000 mJ/cm$^2$ for example ranging from about 250 mJ/cm$^2$ to about 900 mJ/cm$^2$, and as a further example from about 300 mJ/cm$^2$ to about 850 mJ/cm$^2$.

The wet film can crosslink by known techniques. Non-limiting examples include photoinduced polymerization, such as free radical polymerization, spectrally sensitized photoinduced free radical polymerization, photoinduced cationic polymerization, spectrally sensitized photoinduced cationic polymerization, and photoinduced cycloaddition; electron beam induced polymerization, such as electron beam induced free radical polymerization, electron beam induced cationic polymerization, and electron beam induced cycloaddition; and thermally induced polymerization, such as thermally induced cationic polymerization.

A dielectric layer 14, 14' formed using the liquid coating process can exhibit improved optical performance, i.e., be a precision dielectric layer. A precision dielectric layer 14, 14' can be understood to mean a dielectric layer having less than about 3% optical thickness variation various across the layer.

Conventional deposition processes for use in the method disclosed herein include, but are not limited to, physical vapor deposition (PVD), sputtering onto a mechanically vibrating bed of particles, decomposition by pyrolysis of metal-organo compounds, a CVD fluidized bed, chemical vapor deposition, thin-film deposition, atomic layer deposition, etc., including modified techniques such as plasma enhanced and fluidized bed.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a device can be dynamic in its use and operation, this disclosure is intended to encompass the equivalents, means, systems and methods of the use of the device and/or article of manufacture and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the invention are intended to be within the scope of the invention. Such variations are not to be regarded as a departure from the spirit and scope of the invention.

We claim:

1. An article comprising:
a magnet containing layer including a first major surface and a second major surface;
a first metallic layer on the first major surface of the magnet containing layer;
a first dielectric layer on the first metallic layer;
a second metallic layer on the first dielectric layer;
a third metallic layer on the second major surface of the magnet containing layer;
a second dielectric layer on the third metallic layer; and
a fourth metallic layer on the second dielectric layer;
wherein the first dielectric layer has a first composition and the second dielectric layer has a second composition, the first composition and the second composition each made from ingredients that include a mercapto modified polyester acrylate, an amine modified polyether tetraacrylate, at least one phosphineoxide, 1,6-hexanediol diacrylate, a leveling agent, a defoamer and a plurality of nanosized particles, the first composition and the second composition being the same or different;
wherein the first metallic layer and the third metallic layer each consists essentially of a reflective material independently selected from aluminum, copper, silver, gold, platinum, palladium, nickel, cobalt, niobium, chromium, combinations thereof, or alloys thereof;
wherein the article is a pigment flake;
wherein the first dielectric layer and the second dielectric layer each have an optical thickness ranging from about 1 nm to about 700 nm; and
wherein the first dielectric layer and the second dielectric layer each have an optical thickness variation of 3% or less across the layer.

2. The article of claim 1, further comprising a substrate, wherein the second metallic layer is deposited on the substrate.

3. The article of claim 1, wherein the second metallic layer comprises a pattern.

4. The article of claim 1, wherein the first dielectric layer and the second dielectric layer have a refractive index of from about 1.2 to about 2.6.

5. The article of claim 1, wherein the ingredients of the first composition and the ingredients of the second composition each comprise a second phosphineoxide.

6. The article of claim 5,
wherein the phosphineoxide includes diphenyl (2,4,6-trimethylbenzoyl) phosphine oxide and the second phosphineoxide is bis(2,4,6-trimethylbenzoyl)-phenylphosphineoxide, and further wherein the defoamer includes a silicone free liquid organic polymer.

7. The article of claim 1, wherein the first metallic layer is a reflector layer, the second metallic layer is an absorber layer, the third metallic layer is a reflector layer and the fourth metallic layer is an absorber layer.

8. The article of claim 1, wherein the ingredients of the first composition and the ingredients of the second composition each further include a sensitizer.

9. The article of claim 1, wherein the magnet containing layer comprises a magnetic material selected from a ferromagnetic material or ferrimagnetic material.

10. The article of claim 1, wherein the nanosized particles include are selected from metalorganic compounds, $ZrO_2$, $In_2O_3$, $In_2O_3$—$SnO$, $SnO$, metal sulfides, chalcogenides, quantum dots, fluorides, carbonates, or mixtures thereof.

11. A color shifting colorant comprising:
the article of claim 1 and a liquid medium.

* * * * *